United States Patent
Martin

(10) Patent No.: US 10,847,180 B1
(45) Date of Patent: Nov. 24, 2020

(54) CLEARANCE CONTROL USING ACTUATION EFFICIENCY

(71) Applicant: Seagate Technology LLC, Cupertino, CA (US)

(72) Inventor: Richard Edward Martin, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 16/683,698

(22) Filed: Nov. 14, 2019

(51) Int. Cl.
  *G11B 5/54* (2006.01)
  *G11B 5/60* (2006.01)
  *G11B 33/14* (2006.01)

(52) U.S. Cl.
  CPC ............ *G11B 5/607* (2013.01); *G11B 33/144* (2013.01)

(58) Field of Classification Search
  CPC ....... G11B 5/54; G11B 33/14; G11B 33/1406; G11B 33/1446; G11B 5/58
  USPC .................................. 360/75, 97.12
  See application file for complete search history.

(56) References Cited

U.S. PATENT DOCUMENTS

| | | | |
|---|---|---|---|
| 7,310,194 B1 | 12/2007 | Schardt et al. | |
| 7,619,847 B2 * | 11/2009 | Takahashi | G11B 5/6064 360/75 |
| 7,852,583 B2 | 12/2010 | Uji et al. | |
| 8,009,380 B2 * | 8/2011 | Matsushita | G11B 5/6005 360/75 |
| 9,001,451 B1 * | 4/2015 | Martin | G11B 5/6029 360/75 |
| 9,595,278 B1 | 3/2017 | Martin | |
| 9,818,439 B1 | 11/2017 | Riddering et al. | |
| 2010/0208387 A1 * | 8/2010 | Ehrlich | G11B 5/607 360/97.12 |

* cited by examiner

*Primary Examiner* — Nabil Z Hindi
(74) *Attorney, Agent, or Firm* — Westman Champlin & Koehler, P.A.

(57) ABSTRACT

A method including obtaining a target actuation efficiency slope that is a linear function of temperature when a fixed active clearance is maintained between a transducing head and an adjacent storage surface in a sealed storage device. The target efficiency slope is obtained at least in part by a temperature dependence calibration of actuation efficiency. An operating temperature of the storage device is measure. Power to a clearance adjustment mechanism is adjusted to achieve the target actuation efficiency slope at the measured operating temperature.

17 Claims, 9 Drawing Sheets

CLEARANCE CONTROL USING ACTUATION EFFICIENCY

SUMMARY

A method is provided that obtains a target actuation efficiency slope that is a linear function of temperature when a fixed active clearance is maintained between a transducing head and an adjacent storage surface in a sealed storage device. The target efficiency slope is obtained at least in part by a temperature dependence calibration of actuation efficiency. An operating temperature of the storage device is measured power to a clearance adjustment mechanism is adjusted to achieve the target actuation efficiency slope at the measured operating temperature.

A control system includes a clearance actuation mechanism configured to maintain a fixed active clearance between a transducing head and an adjacent storage surface in a sealed storage device. A temperature sensor is configured to measure an operating temperature of the sealed storage device. A processing circuit is configured to adjust power to the clearance actuation mechanism until a target actuation efficiency slope is achieved at the measured operating temperature. The target actuation efficiency slope is a linear function of temperature when the fixed active clearance between the transducing head and the adjacent storage surface is maintained and is obtained at least by a temperature dependence calibration of actuation efficiency.

A method is provided that includes producing a target actuation efficiency slope that is a linear function of temperature when a fixed active clearance is maintained between a transducing head and an adjacent surface in a sealed storage device. Operating temperature of the storage device is measured. A measured actuation efficiency slope that corresponds to the measured operating temperature is produced. Power to a clearance adjustment mechanism is adjusted to maintain active clearance of the transducing head relative to the adjacent storage surface until the measured actuation efficiency slope matches the target actuation efficiency slope.

This summary is not intended to describe each disclosed embodiment or every implementation of managing adjacent track interference in a data storage device as described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Control systems move and maintain objects in a target position relative to another object. For example, hard disc drives (HDDs) use servo control systems to position read/write transducers adjacent tracks on a storage media, and use fly height control systems to control the clearance distance or fly height of read/write transducers adjacent a corresponding surface of a storage media.

One exemplary fly height control system is field adjust fly height (FAFH). Current FAFH relies on read back amplitude of the read transducer or sensor to detect and correct for clearance changes that occur during drive operation. The current FAFH uses absolute amplitude measurements at two different frequencies and takes their ratio. This ratio cancels out any frequency-independent gain changes and therefore the accuracy of the current FAFH is affected by anything that changes high frequency amplitude by a different amount than low frequency amplitude. These gain changes may be misperceived as a clearance change. In particular, two primary sources of the current FAFH inaccuracy are due to two different frequency dependent amplitude changes: thermal decay and reader degradation (e.g., oxidation).

For thermal decay, low frequency amplitude decays faster than high frequency amplitude and absolute amplitude FAFH incorrectly sees this changes as a clearance decrease or drop and makes an incorrect adjustment. For reader degradation, high frequency amplitude tends to be preferentially affected, which is incorrectly perceived by absolute amplitude FAFH as a clearance increase and makes an incorrect adjustment. When fly height is adjusted to be too close, the transducers may detrimentally contact the surface of the storage media causing read errors and damage to the media. When fly height is adjusted too far away, the transducers may make read errors. In either instance, the reliability of the reading system is compromised.

Described herein are various embodiments of a clearance control system that uses actuation efficiency rather than absolute amplitude to maintain a target close point clearance of transducers relative to a storage surface of a storage media. Actuation efficiency is measured by comparing passive amplitude to active amplitude. These two measurements are measured consecutively (at nearly the same time) causing a near zero probability of the reader being in a different state during one measurement state (either passive or active) than the other. As a result, the actuation efficiency measurement is practically immune to thermal decay and reader oxidation/degradation.

Figure 1:
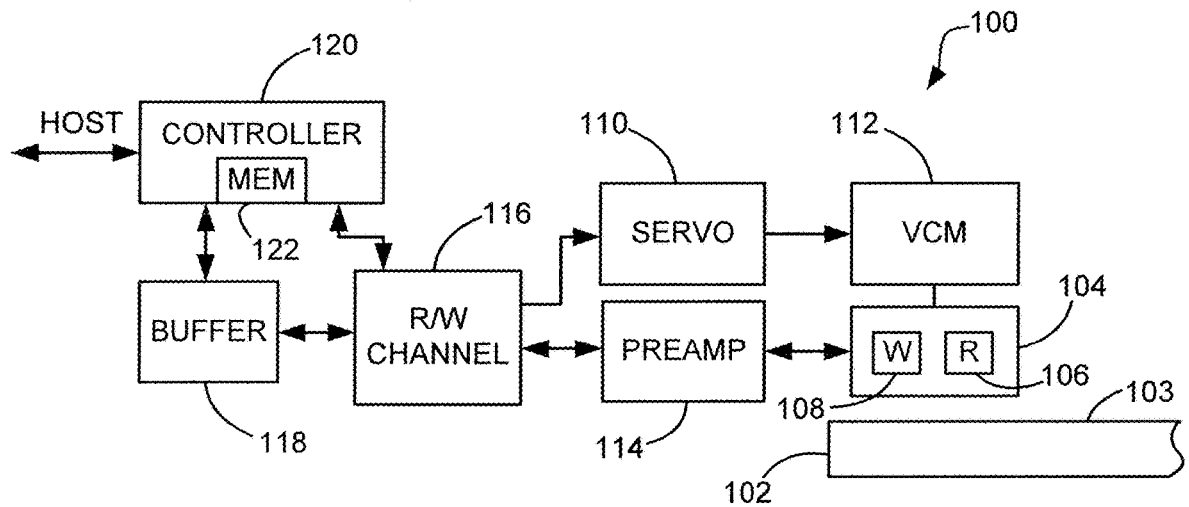
FIG. 1 is a functional block diagram of a data storage device in which embodiments of the disclosure may be useful.

FIG. 1 is a functional block diagram of a data storage device 100 in which embodiments of the disclosure may be useful. Storage device 100 retrieves data from a host device (not separately shown) and stored on one or more rotatable data recording media (e.g., one or more discs) 102, although this is merely exemplary and not limiting. Other types of storage medium are possible. Data on medium 102 is accessed by a read/write transducer (transducing head) 104 which is supported adjacent the rotating medium 102 during device operation. Transducing head 104 includes one or more read elements (R) 106 and one or more write elements (W) 108. Read elements (R) 106 and write elements (W) respectively read data from and write data to a recording surface 103 of a data recording medium 102. A servo control circuit 110 provides current to a voice coil motor (VCM) 112 to position the respective read elements (R) 106 and write elements (W) 108 adjacent data tracks defined on medium 102.

Transducing head 104 is configured to be supported adjacent recording or storage surface 103 of medium 102 using fluidic (e.g., air) currents established by high speed rotation of medium 102. This maintains head 104 in a nominally stable, non-contacting relation at a selected close clearance distance (fly-height) 101, as represented in FIG. 2.

A preamplifier/driver circuit (preamp) 114 applies signal preconditioning and preamplification to read signals from the read element(s) (R) 106 during data read operations, and supplies write currents to the write element(s) (W) 108 during data write operations. A number of other functionalities of preamp 114 include head selection, fly height adjustments, proximity sensing, and etc. A read/write (R/W) channel 116 provides data encoding/decoding, a buffer memory 118 provides temporary storage of data during data transfer operations, and a controller 120 provides top level control of storage device 100. Controller 120 may constitute a programmable processor that uses programming steps and control parameters in local controller memory 122. The controller functionality may alternatively be realized in hardware and/or incorporated into the other operative blocks shown in FIG. 1.

Figure 3:
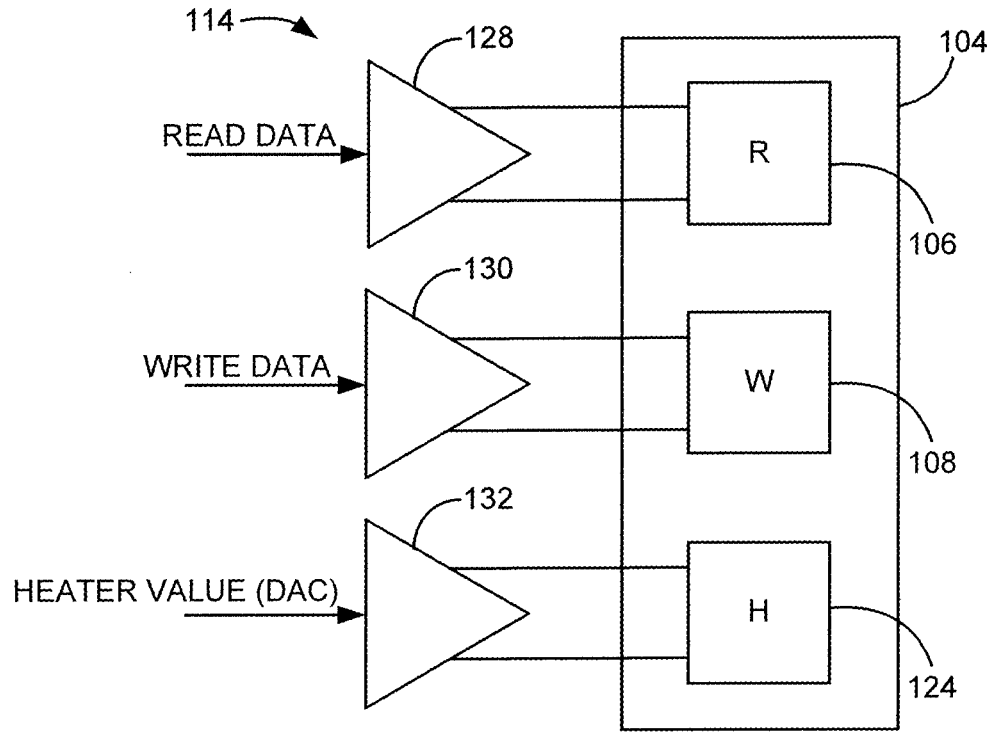
FIG. 3 illustrates control circuitry that interacts with the head of FIG. 1.

FIG. 3 illustrates control circuitry of preamp 114 that interacts in conjunction with transducing head 104. Transducing head 104 includes the previously described read and write elements (R) 106, (W) 108 and a clearance adjustment mechanism 124, such as a heater (H). However, other head configurations are possible including head configurations with multiple heaters, multiple proximity sensors and etc. In some embodiments, read element (or sensor) (R) 106 may be a magneto-resistive (MR) magnetic sensor, writer element (W) 108 may be an inductive coil, such as a perpendicular magnetic recording transducer. In addition, write element (W) 108 may include heat assisted magnetic recording (HAMR) components such as a light source, near field transducer (NFT), etc.

Figure 2:
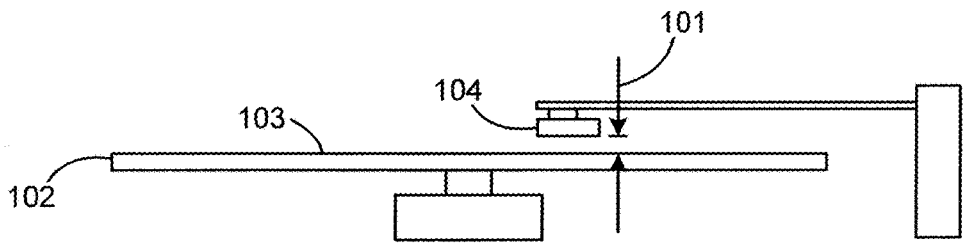
FIG. 2 illustrates a clearance distance or fly height of the head illustrated in FIG. 1.

As mentioned, heater (H) 124 is a type of clearance adjustment mechanism that adjusts the clearance distance or fly height 101 (FIG. 2) between read element 106 and storage medium 102 (FIGS. 1 and 2). Heater 124 may include an electrically resistive material that induces changes in fly height responsive to thermal expansion of head 104.

Preamp 114 includes a preamplifier stage 128, writer driver 130 and a power driver 132. Preamplifier stage 128 applies preamplification and other signal conditioning to a read back signal obtained from read element (R) 106 during a read operation and forwards the preconditioned signals for processing by read/write channel 116. Write driver 128 provides a time varying, bi-directional pulse width modulate (PWM) write current to the write element (W) 108 responsive to serialized write data supplied by read/write channel 116. Power driver 132 supplies voltage and/or current to heater 124 responsive to an input heater value. The greater the input heater value, the larger the amount of heat generated by heater 124 and the lower the fly height of head 104. The input heater value may be supplied by controller 120 (FIG. 1). In some cases, a multi-bit digital value is supplied as a heater digital-to-analog (DAC) signal with driver 132 providing an output analog power level responsive to the magnitude of the input heater DAC signal.

In sealed data storage devices, temperature and pressure vary together in a deterministic way. As a result of the hermetic sealing and the use of desiccants, the variation of humidity in sealed data storage devices is minimal. Under these conditions, heater 124 provides actuation efficiency to transducing head 104 by way of heater induced reader protrusion (HIRP), which is a linear function of both temperature of the data storage device and active clearance of transducing head 104. In other words, HIRP is temperature dependent. In addition, HIRP is a relative measurement of passible and active reader amplitude, which does not depend on an absolute amplitude reference. As such and as previously described, actuation efficiency or HIRP is unaffected by thermal decay and reader degradation.

Figure 4:
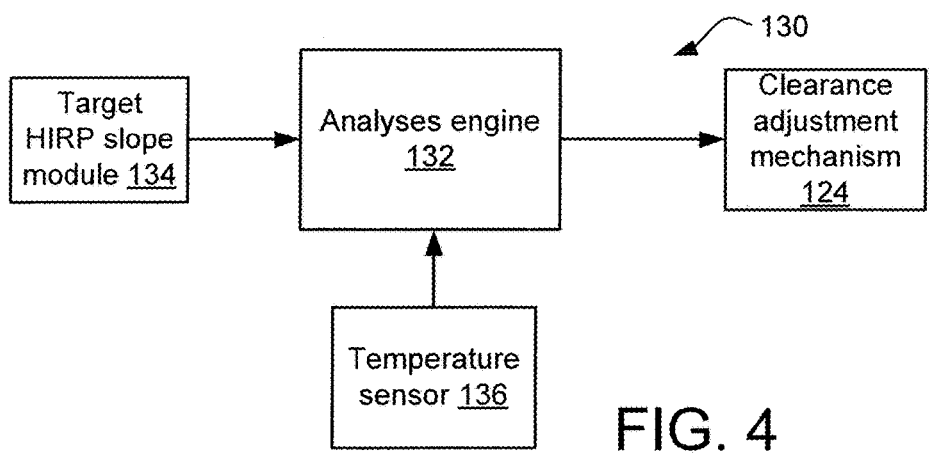
FIG. 4 illustrates a functional block diagram representing a clearance control circuit using actuation efficiency.

FIG. 4 illustrates a processing circuit 130 of data storage device 100. Processing circuit 130 may be embodied in one or more of the functional blocks represented in FIG. 1. As will be explained, processing circuit 130 operates to detect an operating temperature of device 100 and to adjust an existing clearance distance (fly height) of transducing head or transducer 104 so as to maintain active clearance of transducing head 104 relative to adjacent storage surface 103 of storage medium 102 until a target actuation efficiency slope or target HIRP slope is achieved.

Processing circuit 130 uses calibration data obtained and stored in a target HIRP slope module 134 during device manufacture, and thereafter operates at suitable times during subsequent field use. Circuit 130 includes an analyses engine 132, target HIRP slope module 134, receives device temperature readings from a temperature sensor 136 and communicates power requirements to a clearance adjustment mechanism 124, for example, a heater 124 that is part of transducing head 104.

Figure 5:
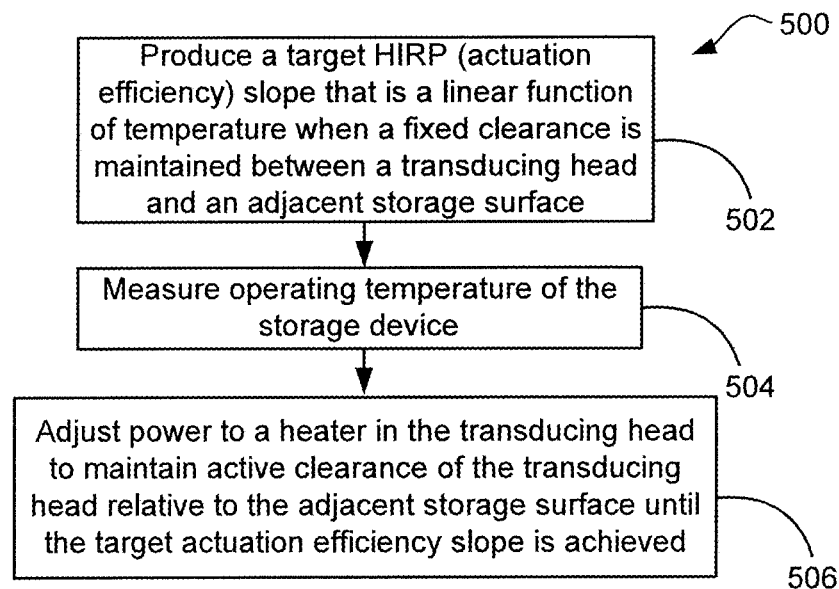
FIG. 5 illustrates a flow diagram of a method of controlling fly-height (or head clearance) in a storage device that uses actuation efficiency to eliminate the effects of thermal decay and reader degradation.

FIG. 5 illustrates a flow diagram of a method 500 of controlling fly height (or head clearance) in a data storage device that is carried out by processing circuit 130 and that eliminates the effects of thermal decay and reader degradation. To use actuation efficiency or HIRP in the described clearance control system, at block 502 a target HIRP (actuation efficiency) slope is obtained or produced and is used as the primary clearance control system input. The target HIRP slope is calculated, determined and stored using target HIRP slope module 134 and analyses engine 132. The target actuation efficiency slope is a linear function of temperature when a fixed clearance is maintained between a transducing head, such as transducing head 104, and an adjacent storage surface, such as storage surface 103 of sealed storage medium 102.

Figure 6:
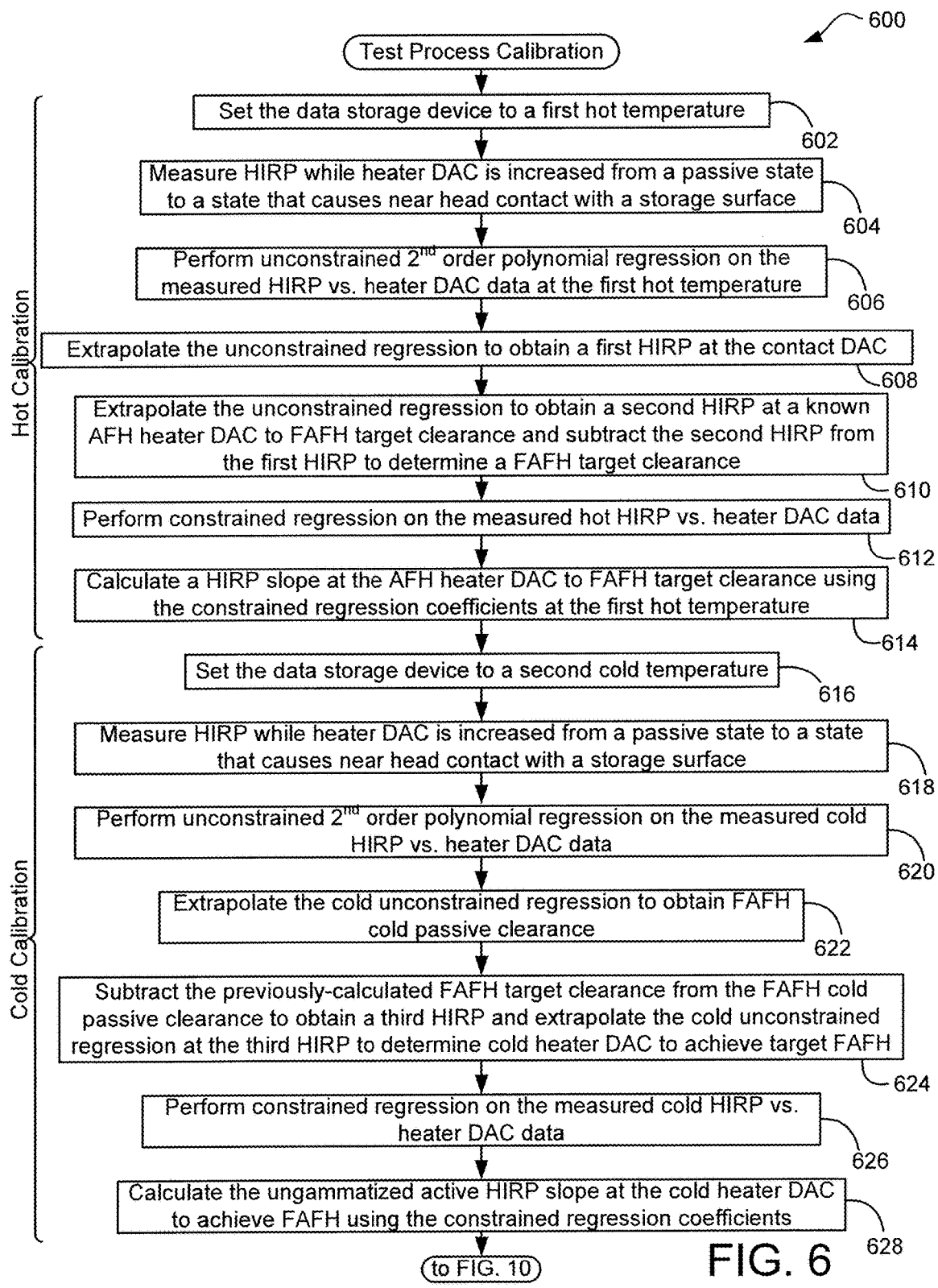
FIGS. 6 and 11 illustrate a flow diagram of a test process calibration in an exemplary storage device to obtain a target HIRP slope.
Figure 11:
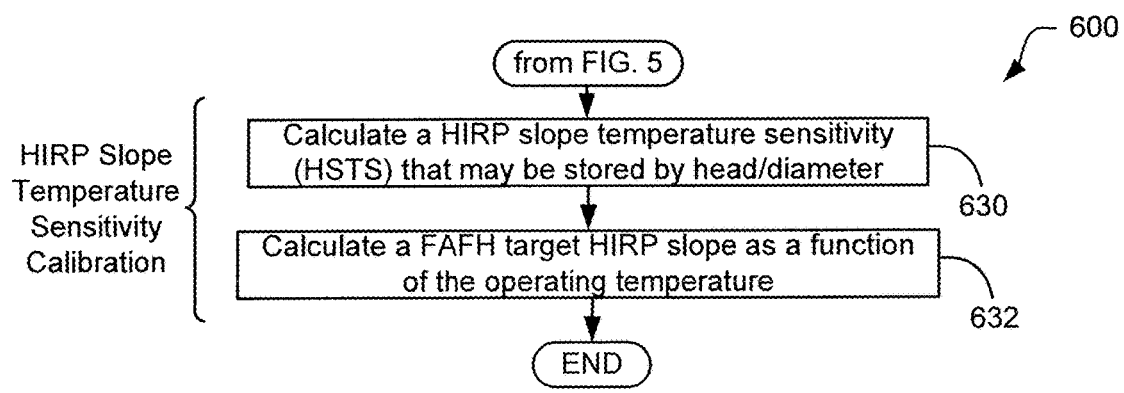

To obtain or produce the target HIRP slope, FIGS. 6 and 11 illustrate a flow diagram of a test process calibration 600 used on an exemplary sealed storage device, such as sealed storage device 100, by processing circuit 130. In general, a target HIRP slope is obtained or produced at least in part by completing a two temperature or temperature dependent calibration test during device manufacture. The test is completed at a first hot storage device temperature to obtain a local active HIRP slope at the first hot storage device temperature and is completed at a second cold storage device temperature to obtain a local active HIRP slope at the second cold storage device temperature. In other words, a first portion of the test process calibration includes performing a hot calibration and a second portion of the test process calibration includes performing a cold calibration and the first hot temperature is treater than the second cold temperature.

Figure 7:
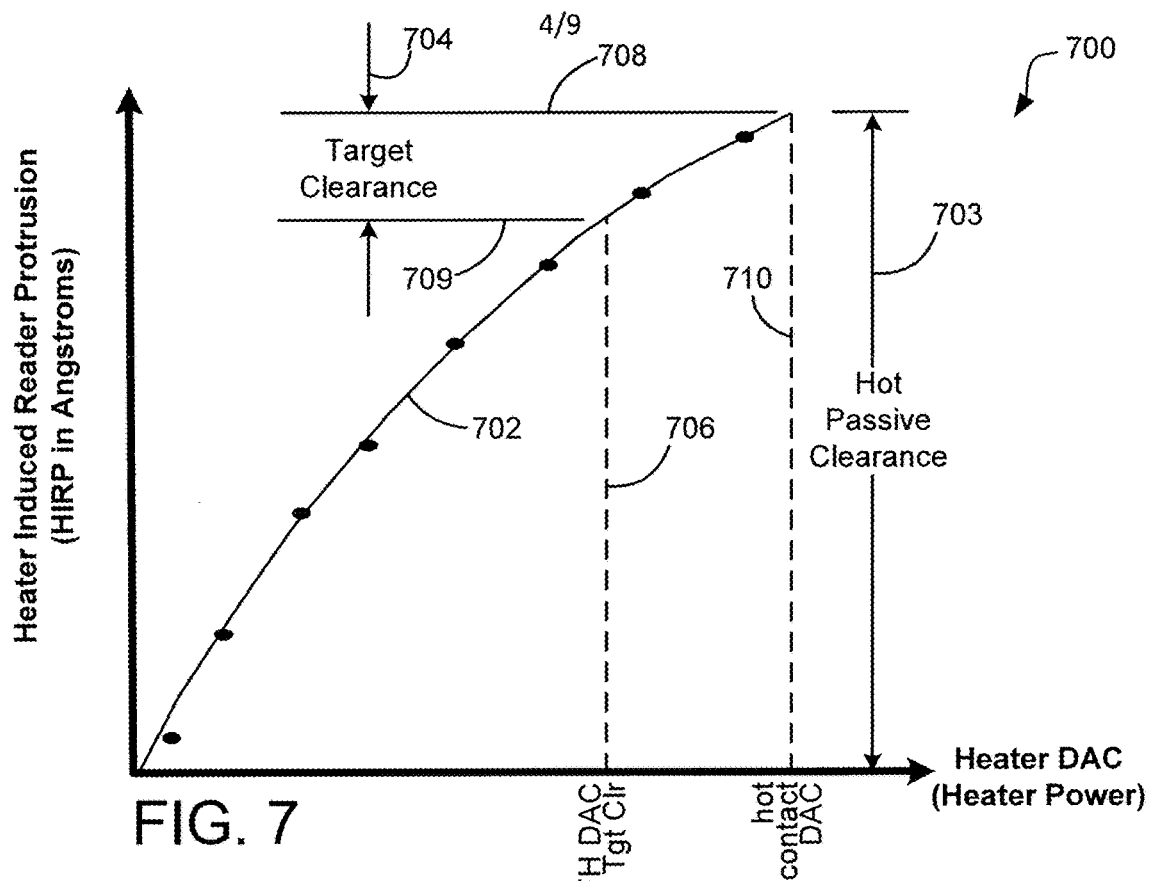
FIG. 7 is a graphical representation of the calibration of HIRP at a first hot temperature as shown in FIG. 6.

At block 602, the storage device is set to the first hot temperature. At block 604, HIRP is measured from a passive heater state, which is where the heater is turned off, to an increasing amount of active input heater DAC until the head is near contact on the storage surface. As input heater DAC increases, the measurement of HIRP increases. The difference between zero HIRP, where there is no input heater DAC, to when input heater DAC places the head or reader near contact on the storage surface under the first hot storage device temperature is known as hot passive clearance 603. The data points measured in block 604 are illustrated in FIG. 7, which is a graphical representation 700 of HIRP vs. heater DAC at the first hot temperature of the storage device. At block 606, an unconstrained second order polynomial regression is performed on the measured hot HIRP vs. heater DAC data. That polynomial takes the form of:

$$a_h D^2 + b_h D + c_h = h_h \quad \text{(Equation 1)}$$

where the subscript h denotes values for the hot calibration at the first hot temperature, D is heater DAC and $h_h$ is HIRP for the hot calibration at the first hot temperature.

The unconstrained second order polynomial is fit to the measured HIRP vs. hot heater DAC data points as illustrated by the curved line 702 in FIG. 7. At block 608 and after the unconstrained second order polynomial regression is performed, the unconstrained regression is extrapolated to obtain HIRP 708 at the hot contact heater DAC 710 or where the transducing head is near contact with the adjacent storage surface. At block 610, using a known AFH heater DAC to target 706, HIRP 709 is extrapolated at the known AFH heater DAC to target 706 and HIRP 709 is subtracted from HIRP 708 to determine a target clearance 704.

At block 612, constrained regression is performed on the measured hot HIRP vs. heater DAC data. At block 614, the ungammatized active HIRP slope is calculated at the AFH heater DAC to target 706 using the constrained regression coefficients. The above equation, Equation 1, can be differentiated with respect to heater DAC to obtain the local active HIRP slope at the hot calibration temperature using the following coefficients and equation:

$$h_h' = 2\bar{a}D_T^h + b_h \quad \text{(Equation 2)}$$

where $h_h'$ is active HIRP slope at target clearance taken during the hot temperature calibration, $\bar{a}$ is an average second order HIRP curvature, which is previously calculated, $D_T^h$ is heater DAC to target clearance at the hot temperature calibration and $b_h$ is a first order HIRP slope from constrained regression to HIRP at the hot temperature calibration vs. heater DAC.

Figure 8:
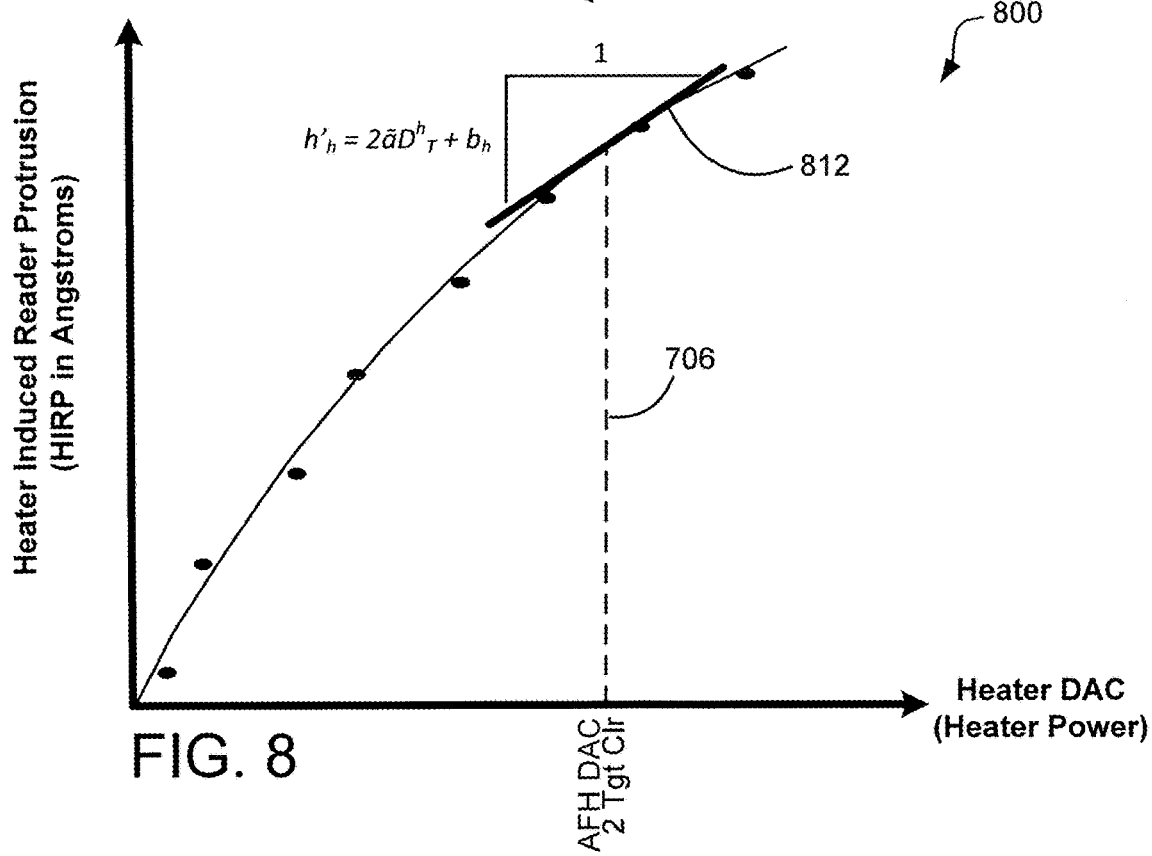
FIG. 8 is a graphical representation of obtaining local active HIRP slope at the first hot temperature as shown in FIG. 6.

FIG. 8 illustrates a graphical representation 800 of calculating local active HIRP slope 812 at AFH heater DAC to target clearance 706, which is local active HIRP slope 812 at the desired active clearance.

Figure 9:
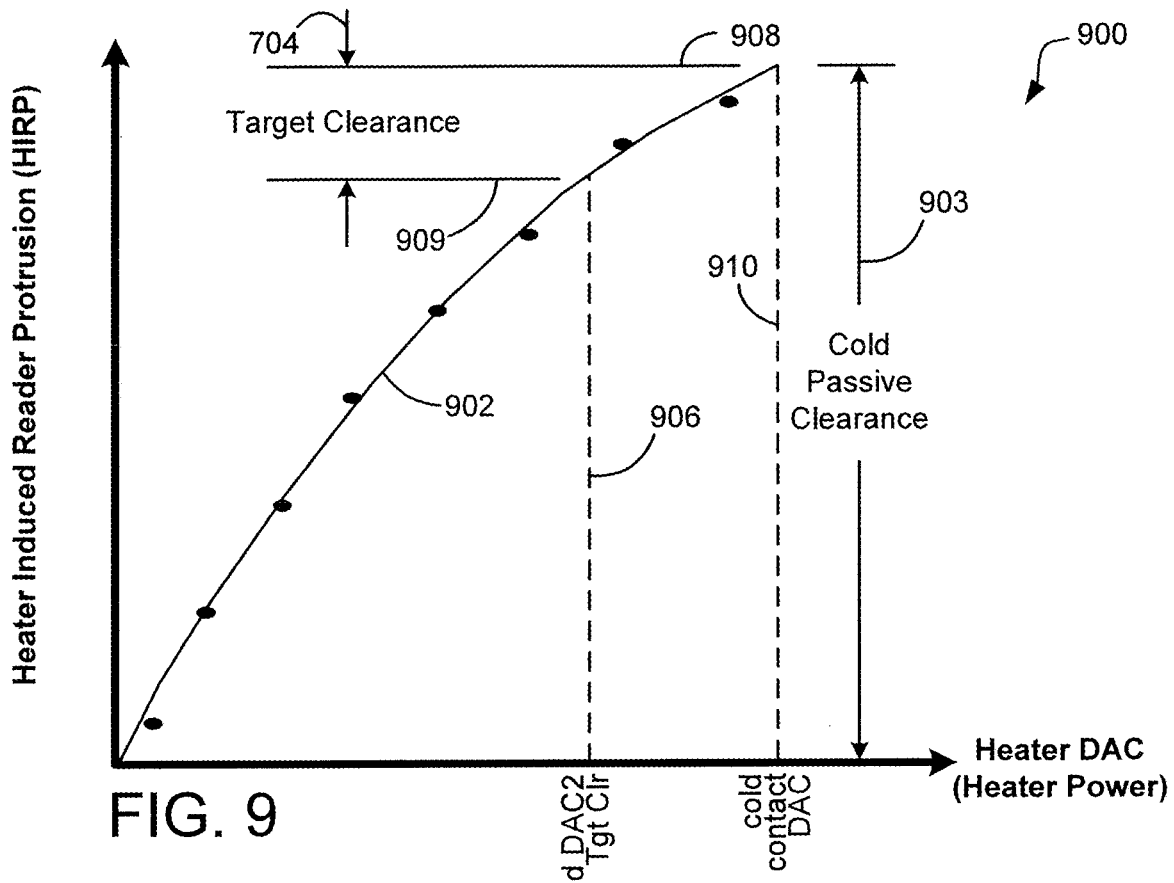
FIG. 9 is a graphical representation of the calibration of HIRP at a second cold temperature as shown in FIG. 6.

Block 614 ends the hot calibration and block 616 begins the cold calibration. At block 616, the storage device is set to a second cold temperature. At block 618, HIRP is measured from a passive heater state, which is where the heater is turned off, to an increasing amount of active input heater DAC until the head is near contact on the storage surface. As input heater DAC increases, the measurement of HIRP increases. The difference between zero HIRP, where there is no input heater DAC, to when input heater DAC places the head or reader near contact on the storage surface under the second cold storage device temperature is known as cold passive clearance 903. The measured data points in block 618 are illustrated in FIG. 9, which is a graphical representation 900 of HIRP vs. heater DAC at the second cold temperature of the storage device. At block 620, an unconstrained second order polynomial regression is performed on the cold HIRP vs. heater DAC data. That polynomial takes the form of:

$$a_c D^2 + b_c D + c_c = h_c \quad \text{(Equation 3)}$$

where the subscript c denotes values for the cold calibration at the second cold temperature, D is heater DAC and $h_c$ is HIRP for the cold calibration at the second cold temperature.

The unconstrained second order polynomial is fit to the measured HIRP vs. cold heater DAC data points as illustrated by the curved line 902 in FIG. 9. At block 622 and after the unconstrained second order polynomial regression is performed, the unconstrained regression is extrapolated to obtain HIRP 908 at the cold contact heater DAC 910. This is called cold passive clearance 903. At block 624, the previously determined target clearance 704 during the hot calibration is subtracted from cold passive clearance 903 to obtain HIRP 909. The unconstrained regression is extrapolated at HIRP 909 to determine cold heater DAC to achieve FAFH target clearance 906.

At block 626, constrained regression is performed on the measured cold HIRP vs. heater DAC data. At block 628, the ungammatized active HIRP slope is calculated at the cold heater DAC to FAFH target clearance 906 using the constrained regression coefficients. The above equation, Equation 3, can be differentiated with respect to heater DAC to obtain the local active HIRP slope at the cold calibration temperature using the following coefficients and equation:

$$h_c' = 2\bar{a}D_T^c + b_c \quad \text{(Equation 4)}$$

where $h_c'$ is active HIRP slope at target clearance taken during the cold temperature calibration, $\bar{a}$ is an average second order HIRP curvature, which is previously calculated, $D_T^c$, is heater DAC to target clearance at the cold temperature calibration and $b_c$ is a first order HIRP slope from constrained regression to HIRP at the cold temperature calibration vs. heater DAC.

Figure 10:
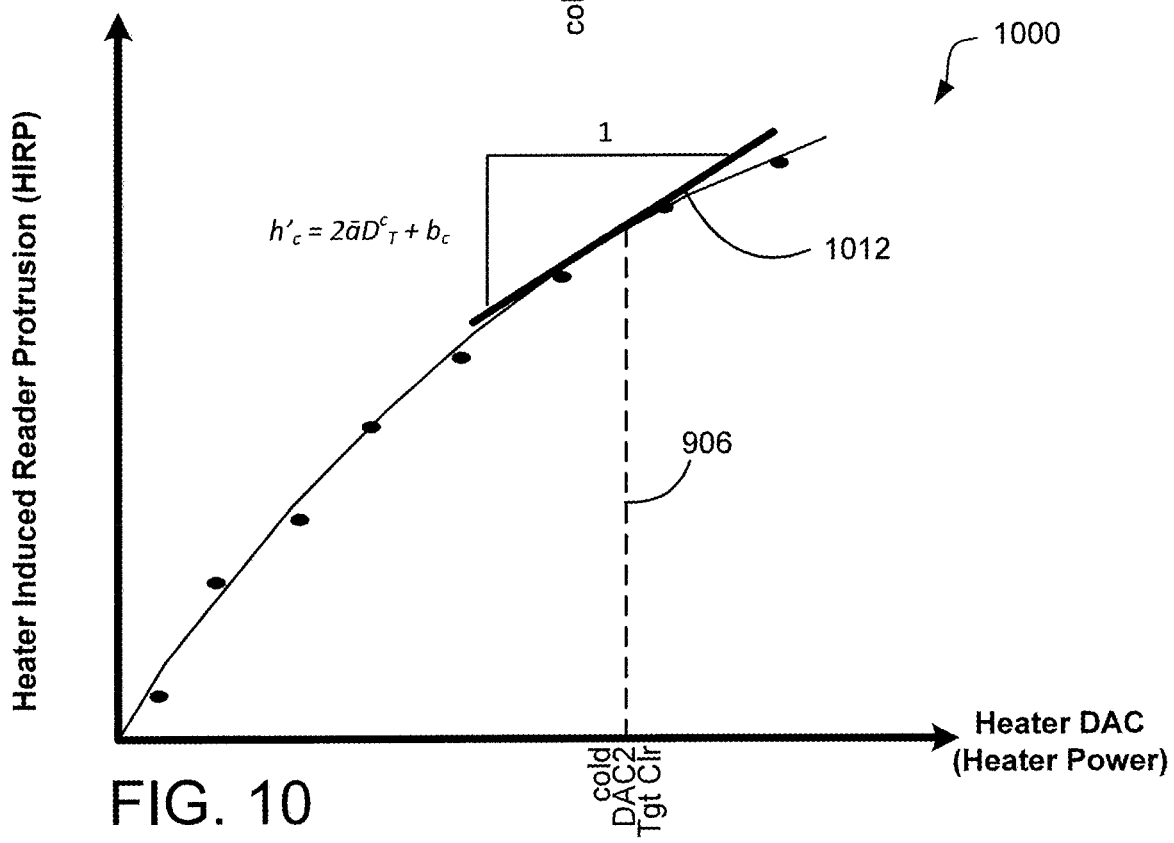
FIG. 10 is a graphical representation of obtaining local active HIRP slope at the second cold temperature as shown in FIG. 6.

FIG. 10 illustrates a graphical representation 1000 of calculating local active HIRP slope 1012 at cold heater DAC to achieve target clearance 906, which is local active HIRP slope 1012 at the desired active clearance.

Once the hot and cold calibrations are performed at the two storage device temperatures, a HIRP slope temperature sensitivity calibration is performed to produce a target active HIRP slope as a function of temperature and is illustrated in FIG. 11. At block 630 in FIG. 11, HIRP slope temperature sensitivity calibration is done by first calculating a HIRP slope temperature sensitivity that may be stored by head/diameter. This calculation is performed using the following equation:

$$HSTS = -\frac{h'_h - h'_c}{T_h - T_c} \quad \text{(Equation 5)}$$

where HSTS is HIRP slop temperature sensitivity, $h_h'$ is active HIRP slope at target clearance taken during the hot temperature calibration, $h_c'$ is active HIRP slope at target clearance taken during the cold temperature calibration, $T_h$ is the temperature of the storage device at the hot temperature calibration and $T_c$ is the temperature of the storage device at the cold temperature calibration.

At block 632, the target HIRP slope is calculated as a function of the operating temperature. This calculation is performed using the following equation:

$$h_T'=h_h'+(T-T_h) \cdot HSTS \quad \text{(Equation 6)}$$

where $h_T'$ is target HIRP slope, $h_h'$ is active HIRP slope at target clearance taken during the hot temperature calibration, T is the operating temperature, $T_h$ is the temperature of the storage device at the hot temperature calibration and HSTS is HIRP slope temperature sensitivity. The target HIRP slope is then saved into memory, for example, a memory of target HIRP slope module 134.

Figure 12:
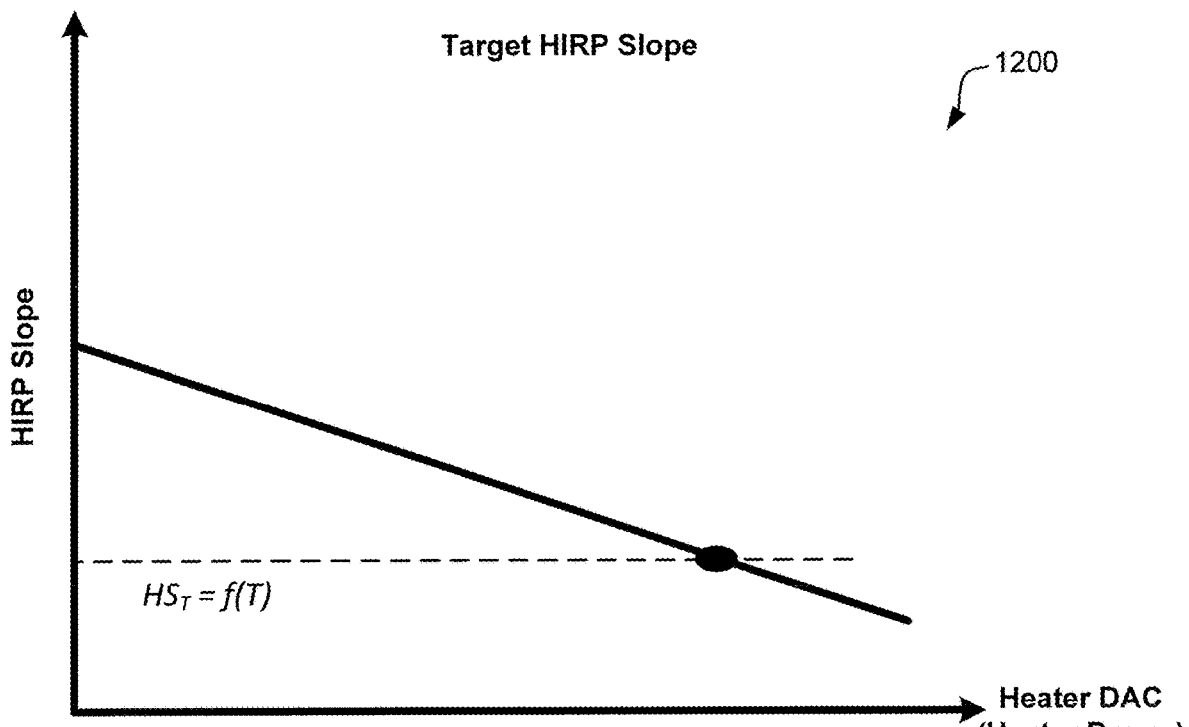
FIG. 12 is a graphical representation of the target HIRP slope.

FIG. 12 illustrates a graphical representation 1200 of the target HIRP slope. As illustrated, the described embodiments of a clearance control system that uses actuation efficiency rather than absolute amplitude includes solving for heater DAC to HIRP slope ($HS_T$) as a function of temperature (See FIG. 11) rather than heater DAC to target clearance.

With reference back to FIG. 5, after a target actuation efficiency or HIRP slope is produced using the above calibration for a particular storage device at block 502, the method moves to block 504 to measure an operating temperature of the storage device. At block 506, power to a clearance adjustment mechanism, such as heater 124 in transducing head 104, is adjusted to maintain active clearance of the transducing head relative to the adjacent storage surface, such as storage surface 103 of storage medium 102, until the target actuation efficiency or HIRP slope is achieved.

In other embodiments, after the target HIRP slope or actuation efficiency is produced and the operating temperature of the storage device is measured, a measured actuation efficiency or HIRP slope may be produced that corresponds with the measured temperature at the given target active clearance. The measured HIRP slope is calculated using the above Equation 6. In this embodiment, power is adjusted to the heater until the measured actuation efficiency or HIRP slope matches the target actuation efficiency or HIRP slope. In all embodiments, maintaining constant active close point clearance remains the target, but the fly-height adjustments are made based on changes in HIRP slope rather than absolute amplitude measurements.

Figure 13:
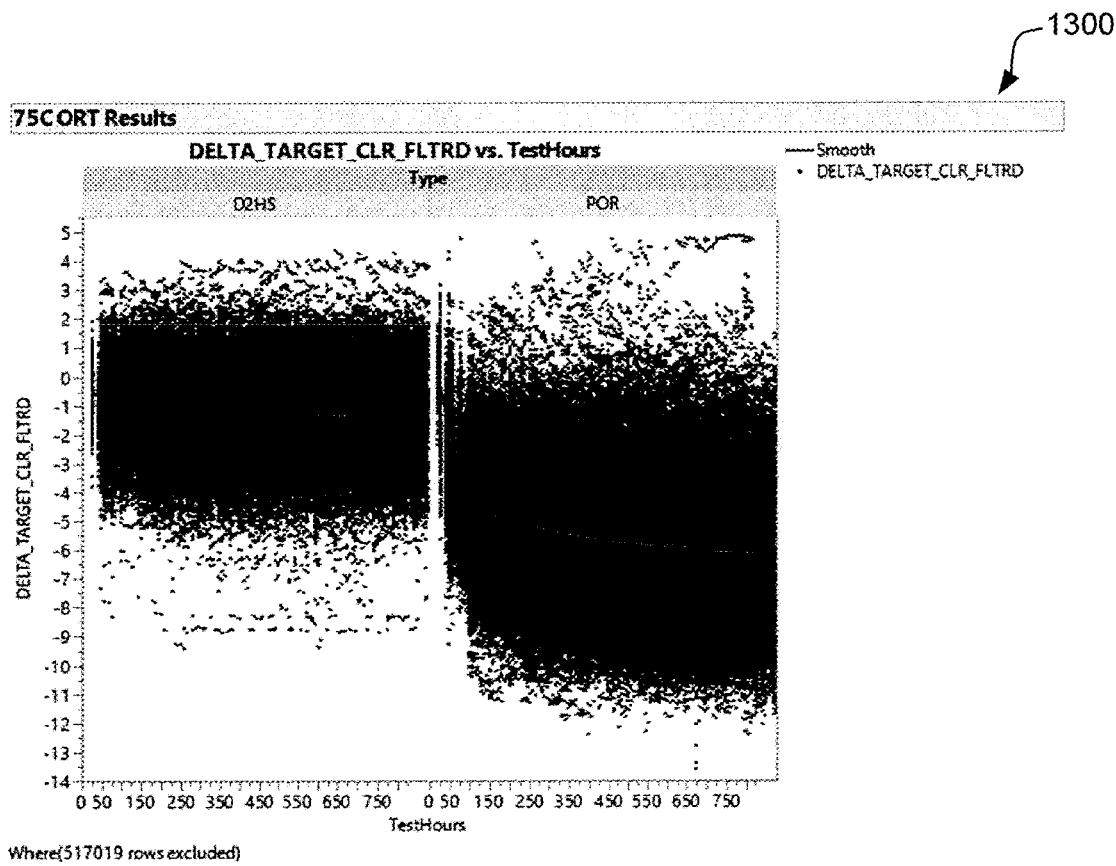
FIG. 13 is a graphical representation that compares storage devices undergoing actuation efficiency clearance control vs. absolute amplitude clearance control.

FIG. 13 illustrates a graphical representation 1300 of 75 storage devices set at an operating temperature of 75° C. for 1000 hours. The left plot illustrates storage devices that use the described embodiments of FAFH using actuation efficiency to adjust heater DAC based on an actuation efficiency or HIRP slope rather than the right plot, which uses FAFH based on absolute amplitude to adjust heater DAC based on a target clearance. The y-axis illustrates clearance in terms of Angstroms and the x-axis illustrates the number of test hours. The ideal or goal is to have as much of a flat smooth line as possible. Here, the drop in the smooth line in the right plot shows that using absolute amplitude to perform FAFH causes a misinterpretation of thermal decay and a FAFH back off that is in error.

Figure 14:
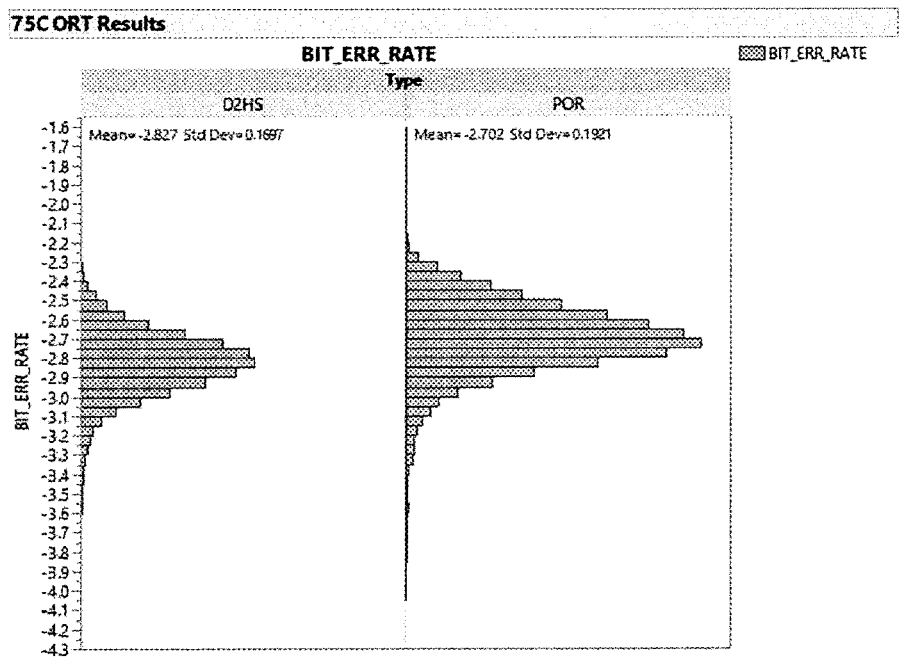
FIG. 14 is a graphical representation that compares bit error rate (BER) of storage devices undergoing actuation efficiency clearance control vs. absolute amplitude clearance control.

FIG. 14 illustrates a graphical representation 1400 of bit error rate (BER) between a left plot illustrating FAFH using actuation efficiency or HIRP slope and a right plot illustrating FAFH based on absolute amplitude. As illustrated, the BER mean and spread is significantly better with the actuation efficiency or HIRP slope-based control system.

Figure 15:
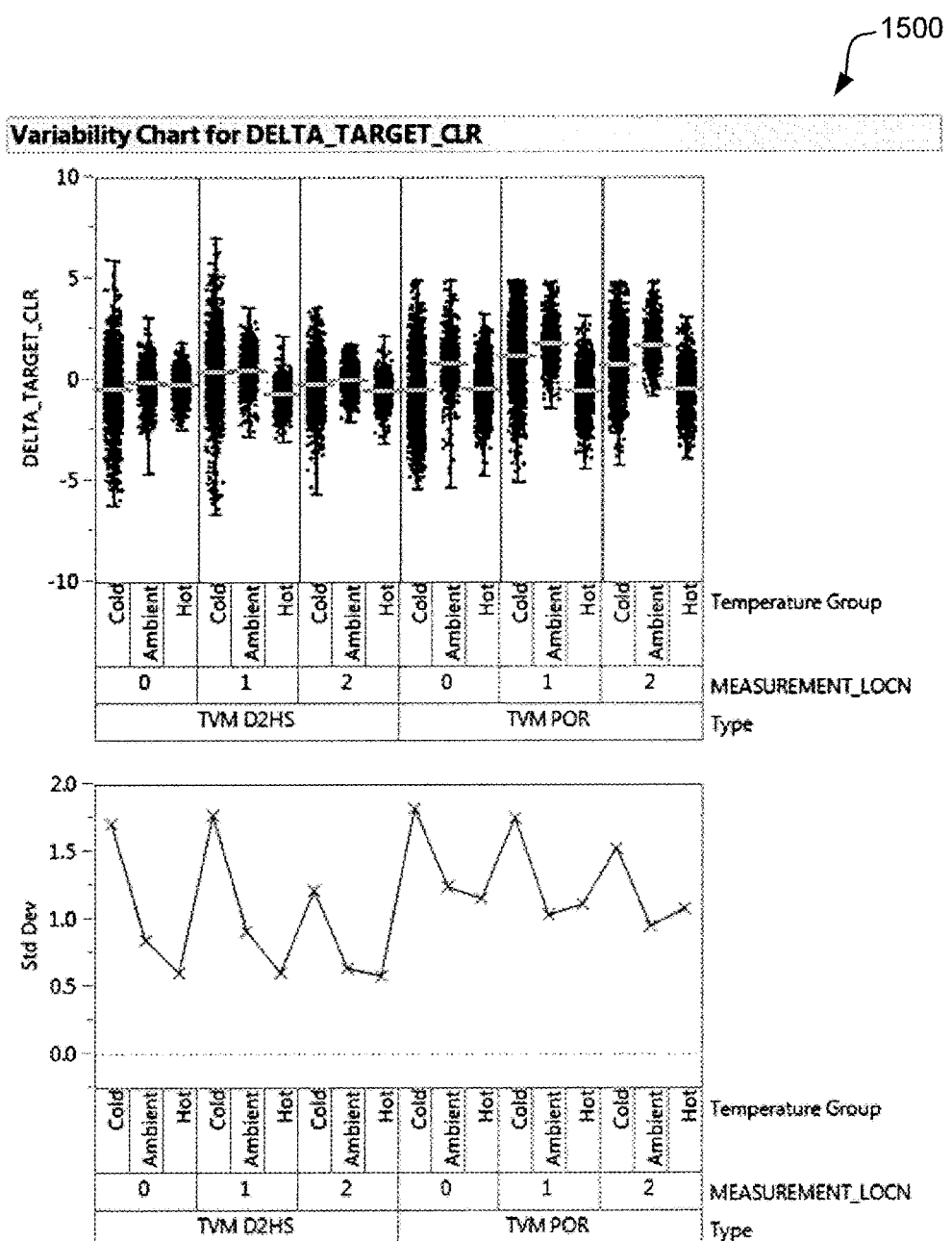
FIG. 15 illustrates a graphical representation of temperature voltage magnitude (TVM) at cold, ambient and hot temperatures between a left plot showing FAFH using actuation efficiency HIRP slope and a right plot showing FAFH based on absolute amplitude.

FIG. 15 illustrates a graphical representation 1500 of temperature voltage magnitude (TVM) at three different temperatures (cold, ambient and hot) between a left plot illustrating FAFH using actuation efficiency HIRP slope and a right plot illustrating FAFH based on absolute amplitude. For example, the cold temperature may be at 5° C., the ambient temperature is room temperature and the hot temperature may be at 65° C. The goal or ideal is for the standard deviation of each adjustment spread be as close to 0 as possible. As illustrated, FAFH based on actuation efficiency and FAFH based on absolute amplitude are close to the same at a cold temperature. However, at a hot temperature, FAFH base actuation efficiency outperform FAFH based on absolute amplitude.

Figure 16:
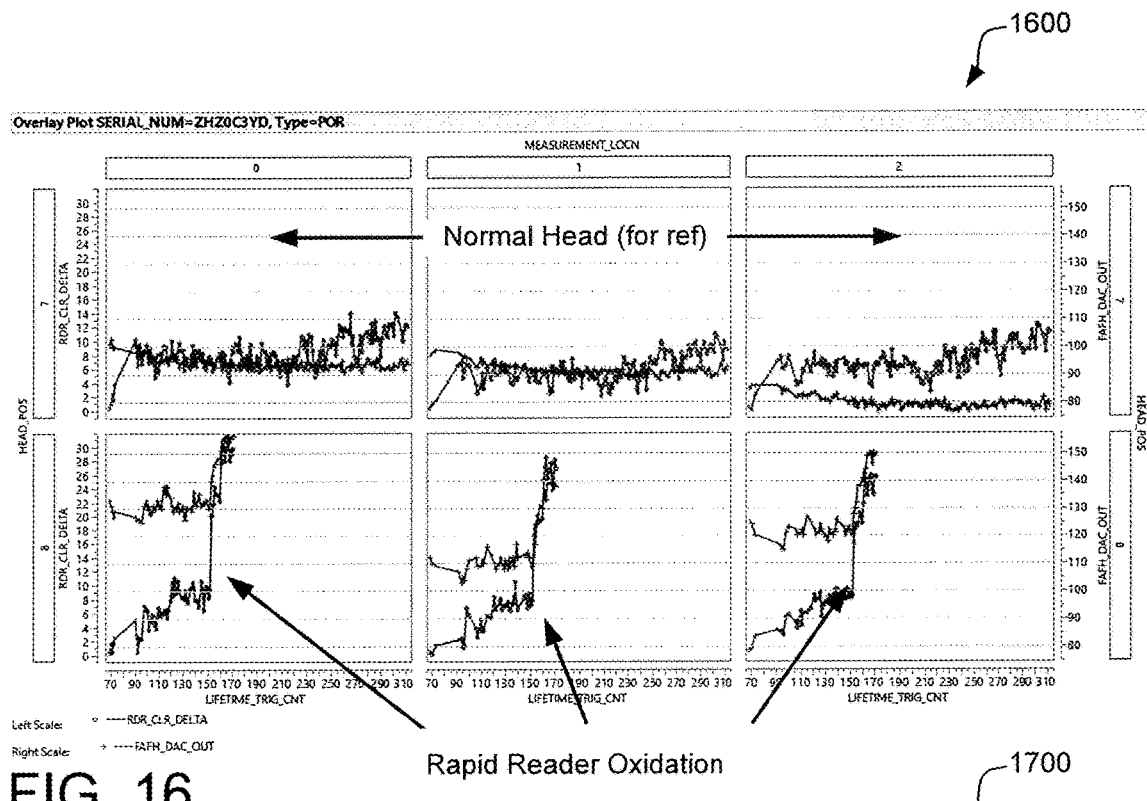
FIG. 16 illustrates a graphical representation of clearance vs. life of the head in a storage device that uses FAFH based on absolute amplitude.

FIG. 16 illustrates a graphical representation 1600 of clearance vs. life of the head in a storage device that uses FAFH based on absolute amplitude. The upper plots illustrate normal head performing FAFH based on absolute amplitude and the lower plots illustrate a degrading head performing FAFH based on absolute amplitude. In FIG. 16, the lower plot shows a head having signs of rapid reader oxidation as depicted by the FAFH head degradation metric (lower plot line). The other data shown in the upper line is the FAFH DAC out. When the reader degrades, absolute amplitude is preferentially lost. FAFH based absolution amplitude misinterprets this as fly height increase and pushes toward the storage surface as evidence by the rapid increase in FAFH active heat.

Figure 17:
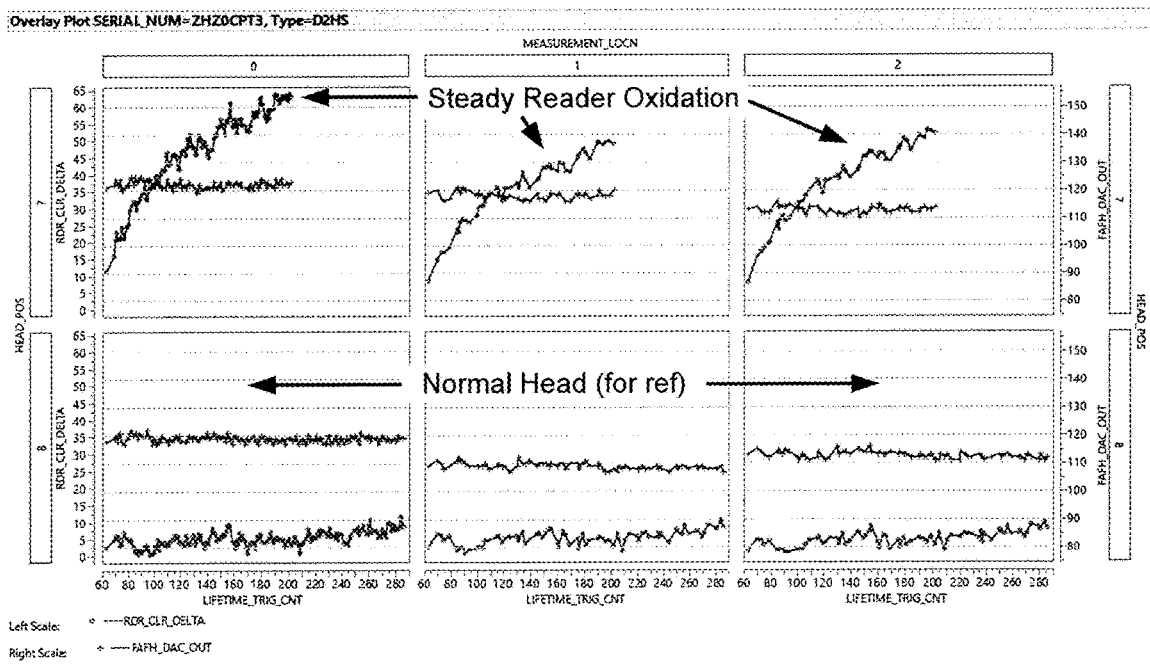
FIG. 17 illustrates a graphical representation of clearance vs. life of the head in a storage device that uses FAFH based actuation efficiency.

FIG. 17 illustrates a graphical representation 1700 of clearance vs. life of the head in a storage device that uses FAFH based actuation efficiency. The upper plots illustrates a steady reader degradation (likely oxidation) performing FAFH based on actuation efficiency and the lower plots illustrate a normal head performing FAFH based on actuation efficiency. As the FAFH reader degradation metric gradually increases as illustrated by the plot line that moves from being a lower plot line to an upper plot line in the degrading head, the other plot line that represents FAFH active heat remains stable.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
obtaining a target actuation efficiency slope that is a linear function of temperature when a fixed active clearance is maintained between a transducing head and an adjacent storage surface in a sealed storage device, wherein the target efficiency slope is obtained at least in part by a temperature dependent calibration of actuation efficiency;
measuring an operating temperature of the storage device; and
adjusting power to a heater located in the transducing head to achieve the target actuation efficiency slope at the measured operating temperature, wherein the heater provides actuation efficiency to the transducing head by way of heater induced reader protrusion (HIRP) and the target actuation efficiency slope comprises a target HIRP slope.

2. The method of claim 1, wherein the temperature dependence calibration comprises:
obtaining a local active actuation efficiency (HIRP) slope at a first temperature; and
obtaining a local active actuation efficiency (HIRP) slope at a second temperature;
wherein the first temperature is greater than the second temperature.

3. The method of claim 2, wherein obtaining the target HIRP slope further comprises:
calculating a HIRP slope temperature sensitivity (HSTS) based on the local active HIRP slope at the first temperature and the local active HIRP slope at the second temperature;
calculating the target HIRP slope based on the calibration, the HSTS and a function of the measured operating temperature; and
saving the target HIRP slope.

4. The method of claim 2, wherein obtaining the local active HIRP slope at the first temperature comprises measuring HIRP while increasing heater power (heater DAC) from a passive state to a state that causes near contact of the transducing head with the adjacent storage surface and performing unconstrained regression on the HIRP vs. heater DAC data at the first temperature.

5. The method of claim 4, further comprising extrapolating the unconstrained regression at the first temperature to obtain a first HIRP at a heater DAC where the transducing head is near contact with the adjacent storage surface.

6. The method of claim 5, further comprising extrapolating the unconstrained regression at the first temperature to obtain a second HIRP at a known active fly height (AFH) heater DAC to target clearance and subtracting the second HIRP from the first HIRP to determine a target clearance.

7. The method of claim 6, further comprising performing constrained regression on the HIRP vs. heater DAC data at the first temperature to obtain the local active HIRP slope at the AFH heater DAC to target clearance using coefficients from the constrained regression at the first temperature.

8. The method of claim 7, wherein obtaining the local active HIRP slope at the second temperature comprises measuring HIRP while increasing heater DAC from a passive state to a state that causes near contact of the transducing head with the adjacent storage surface and performing unconstrained regression on the HIRP vs. heater DAC data at the second temperature.

9. The method of claim 8, further comprising extrapolating the unconstrained regression at the second temperature to obtain passive clearance, subtracting the target clearance obtained during the calibration at the first temperature from the passive clearance to obtain a third HIRP and extrapolating the unconstrained regression of the second temperature at the third HIRP to obtain heater DAC to achieve target clearance.

10. The method of claim 9, further comprising performing constrained regression on the HIRP vs. heater DAC data at the second temperature to obtain the local active HIRP slope at the heater DAC to achieve target clearance using coefficients from the constrained regression at the second temperature.

11. A control system comprising:
a heater located in a transducing head configured to maintain a fixed active clearance between the transducing head and an adjacent storage surface in a sealed storage device, wherein the heater provides actuation efficiency to the transducing head by way of heater induced reader protrusion (HIRP) and wherein the target actuation efficiency slope comprises a target HIRP slope;
a temperature sensor configured to measure an operating temperature of the sealed storage device; and
a processing circuit configured to adjust power to the clearance actuation mechanism until a target actuation efficiency slope is achieved at the measured operating temperature, wherein the target actuation efficiency slope is a linear function of temperature when the fixed active clearance between the transducing head and the adjacent storage surface is maintained and is obtained at least in part by a temperature dependent calibration of actuation efficiency.

12. The control system of claim 11, wherein the temperature dependence calibration is performed at a first temperature to obtain a first local HIRP slope and performed at a second temperature to obtain a second local HIRP slope, the first temperature being greater than the second temperature.

13. The control system of claim 12, wherein based on the calibration, a HIRP slope temperature sensitivity (HSTS) is calculated.

14. The control system of claim 13, wherein based on the calibration and the HSTS calculation, the target HIRP slope is calculated as a function of the measured operating temperature and is saved.

15. A method comprising:
producing a target actuation efficiency slope that is a linear function of temperature when a fixed active clearance is maintained between a transducing head and an adjacent surface in a sealed storage device;
measuring operating temperature of the storage device;
producing a measured actuation efficiency slope corresponding to the measured operating temperature; and
adjusting power to a heater located in the transducing heat to maintain active clearance of the transducing head relative to the adjacent storage surface until the measured actuation efficiency slope matches the target actuation efficiency slope, wherein the heater provides actuation efficiency to the transducing head by way of heater induced reader protrusion (HIRP) and the target actuation efficiency slope comprises a target HIRP slope.

16. The method of claim 15, wherein producing the target actuation efficiency slope comprises calibrating temperature dependent actuation efficiency at a first temperature to obtain a local active actuation efficiency (HIRP) slope and at a second temperature to obtain a local active actuation efficiency (HIRP) slope, the first temperature being greater than the second temperature.

17. The method of claim 16, wherein producing the target actuation efficiency slope comprises:
- calculating a HIRP slope temperature sensitivity (HSTS) based on the locate active HIRP slope at the first temperature and the local active HIRP slope at the second temperature;
- calculating the target HIRP slope based on the calibration, the HSTS and a function of the measured operating temperature; and
- saving the target HIRP slope.

* * * * *